United States Patent [19]
Duffié

[11] Patent Number: 5,451,714
[45] Date of Patent: *Sep. 19, 1995

[54] TELEPHONE AND DATA SIGNAL DISTRIBUTION SYSTEM AND RACEWAY AND PANEL ASSOCIATED THEREWITH

[75] Inventor: David B. Duffié, Cardiff, Calif.

[73] Assignee: Spectranet International, San Diego, Calif.

[*] Notice: The portion of the term of this patent subsequent to Apr. 12, 2011 has been disclaimed.

[21] Appl. No.: 29,763

[22] Filed: Mar. 11, 1993

[51] Int. Cl.6 .............................................. G02B 6/36
[52] U.S. Cl. ..................... 174/48; 174/68.3; 439/207
[58] Field of Search ........... 174/48, 68.1, 68.3; 439/207, 209, 210, 211, 215

[56] References Cited

U.S. PATENT DOCUMENTS

| | | | |
|---|---|---|---|
| 3,255,563 | 6/1966 | Sauer | 52/404 |
| 3,660,591 | 5/1972 | Schultz et al. | 174/70 |
| 3,836,936 | 9/1974 | Clement | 174/48 X |
| 4,135,775 | 1/1979 | Driscoll | 339/22 |
| 4,278,834 | 7/1981 | Boundy | 174/48 |
| 4,308,418 | 12/1981 | van Kuik et al. | 174/48 |
| 4,367,370 | 1/1983 | Wilson et al. | 174/48 |
| 4,375,010 | 2/1983 | Mollenkopf | 174/48 |
| 4,377,724 | 3/1983 | Wilson | 174/48 |
| 4,559,410 | 12/1985 | Hostetter | 174/48 |
| 4,593,505 | 6/1986 | Russell | 52/221 |
| 4,631,881 | 12/1986 | Charman | 52/220 |
| 4,720,953 | 1/1988 | Onishi et al. | 52/221 |
| 4,778,399 | 10/1988 | Schenk | 439/147 |
| 4,800,695 | 1/1989 | Menchetti | 52/221 |
| 4,874,322 | 10/1989 | Dola et al. | 439/210 |
| 4,918,886 | 4/1990 | Benoit et al. | 52/221 |
| 5,024,614 | 6/1991 | Dola et al. | 439/111.4 |
| 5,149,277 | 9/1992 | LeMaster | 439/207 |
| 5,277,609 | 1/1994 | Ondrejka | 439/215 |
| 5,303,320 | 4/1994 | Duffié | 385/135 |
| 5,318,454 | 6/1994 | Deer et al. | 439/215 |

*Primary Examiner*—Leo P. Picard
*Assistant Examiner*—Paramita Ghosh
*Attorney, Agent, or Firm*—Brown, Martin Haller & McClain

[57] ABSTRACT

The present invention involves an electrical or electronic communication signal distribution system which is uniquely designed to cooperate with or interfit into the interior of a typical modular office panel. The system can be considered to have three key interacting and cooperating elements; a removable casing, a complementary raceway, and electrical or electronic wire signal distribution system incorporated into the channel. The system typically provides electrical or electronic wire communication signals to a variety of computers and communication devices such as telephones and facsimile machines. Other aspects of the invention include a panel, such as a modular office partition, or a power pole, into which the system fits, or with which it cooperatively operates; and apparatus comprising the combination of the panel and system.

42 Claims, 2 Drawing Sheets

TELEPHONE AND DATA SIGNAL DISTRIBUTION SYSTEM AND RACEWAY AND PANEL ASSOCIATED THEREWITH

BACKGROUND OF THE INVENTION

1. Field of the Invention

The invention relates distribution of telecommunications and data transmission signals. More particularly, it relates to apparatus for the incorporation of signal distribution systems in modular office furnishings.

2. Description of the Prior Art

It is common in many offices, research facilities, light manufacturing plants and similar work places to have a number of people all working in the same room. Each employee's work space is defined by work area furnishings, which are commonly modular structures. Typically the work areas are formed by the interconnection of modular panels to form clusters of work areas. These panels are normally combined with counters, desk tops, bookshelves, storage cabinets and the like, so that each employee's work space can be configured to the optimum arrangement for the employee's particular work task. Because these various panels are modular, the various work areas can be disassembled and reassembled in numerous configurations as needed to ensure that working areas remain efficient as the company's work needs change.

In most, if not all, of these modular work areas, there will be a variety of types of office equipment including computers and communication equipment such as telephones and facsimile machines. Since most of the work areas are clustered into groups (typically two to twelve work spaces) it is most efficient if the electronic signal cables serving the various work stations are led in centrally through the work station panels for connection to the various pieces of equipment.

In the past, there have been numerous designs of modular panels which have included paths or raceways for power and communication cables. These, however, have been of two types: a) simple conduits through which individual cables are led without organized provision for distribution to the particular pieces of equipment; or b) integrated panels in which conduits and connectors have been part of unique structural aspects of the panels themselves. Typical examples of the latter are those panels which include unique mechanical linkage members to couple two adjacent panels in locked configuration, and in which the electrical connections are routed through the mechanical linkage structure so that locking the two adjacent panels together also simultaneously forms an electrical connection between the panels. Typical examples are shown in U.S. Pat. Nos. 4,367,370 and 4,377,724.

A typically configured prior art remote distribution system reduces the overall efficiency of space planning for the work areas and the manager's ability to organize the work for the most efficient work flow. Because of the significant distance between the conventional distribution room and any individual work station, any change in work task assigned to that station or in the equipment used at that station requires that entirely new wire pairs be run from the remote distribution room to the work station, clearly a time-consuming and expensive project. Also, since the wire pairs have to be run for some distance, including through the ceiling or floor of the work room, it is not uncommon for such changeovers to seriously disrupt the other employees whose workspaces are located near the workspace being converted, at least during the changeover.

It has been known that cables are more efficiently used for communications if the distribution point of a signal to a single target piece of equipment, such as a telephone or computer, is placed as close to that piece of equipment as is physically reasonable. It is much more technically effective and economical to run a multi-conductor trunk cable from a remote location to the modular work area and then run individual wire pairs for the shortest practical distance possible.

Some prior art designers have attempted to utilize this knowledge by providing wire distribution systems within modular panels. These, however, have typically been cumbersome, since a significant portion of the panel must be devoted solely to the distribution system. A typical example is shown in U.S. Pat. No. 4,559,410, where essentially the entire bottom half of a typical modular panel is occupied by a massive distribution structure, including numerous junction boxes and configurations of various devices mounted on several different types of panels. Such systems have been less than successful, since the large size of the units significantly detracts from the efficiency of the modular workplace. Further, such systems effectively prevent the designer from optimizing or changing workspace configurations readily since panels having large scale distribution system within cannot be interchanged with other panels in the modular cluster to allow the designer free rein in designing the work areas.

It would therefore be advantageous to have communication apparatus which provides for distribution of wire pairs from a trunk inlet and which permits rapid and interchangeable communication links and electronic links with individual pieces of equipment, all of which advantageously fits entirely and completely within the size of a typical raceway within or adjacent to a modular panel, such that the raceway's position can be readily varied to permit maximum flexibility in the design of modular clusters. Further, it would be advantageous for the distribution system to be mounted within the raceway in a manner which would permit easy and rapid removal of the system, either for replacement, relocation or repair.

SUMMARY OF THE INVENTION

The present invention involves an electrical or electronic wire communication signal distribution system which is uniquely designed to cooperate with or interfit into the interior of a typical modular office panel. The system can be considered to have three key interacting and cooperating elements; a removable casing; a complementary raceway, and electrical wire distribution means incorporated into the casing. The system typically provides electrical or electronic communication signals to a variety of computers and communication devices such as telephones and facsimile machines. Other aspects of the invention include a panel, such as a modular office partition, or a power pole, into which the system fits, or with which it cooperatively operates; and apparatus comprising the combination of the panel and system.

(The terms "electronic" and "electrical" will be considered synonymous for the purposes of this invention, and the use of one term hereafter in the Specification or claims shall be deemed to include the other unless the context dictates otherwise. Normally for brevity only the term "electrical" will be used, but it will be understood by those skilled in the art that such usage is not meant to be limited by any technical definition unless the text states otherwise.)

In one aspect, the invention involved apparatus for dispersive routing of electrical wires of a communication signal distribution system through partition members which comprises: a panel having an interior bounded by front and rear surfaces joined by a plurality of edges; an elongated raceway having an interior bounded by axial ends and top and bottom spaced apart substantially parallel structural members, the raceway cooperating with the panel; first opening means in the raceway providing for passage of a first plurality of wires from an exterior location into the interior of the raceway; an elongated casing having a length not greater than the length of the raceway and a height and depth not greater than the height and depth of the interior of the raceway, such that the casing is adapted to be removeably secured within the raceway; a plurality of first electrical coupling means within and attached to an interior surface of the casing, each coupling means comprising one gender of a male-female electrical coupler, and at least one of the coupling means being connected to a wire in the first plurality of wires; second opening means comprising an aperture in the raceway providing for passage of a second plurality of electrical wires between the interior of the raceway and the interior of the panel, each of the wires terminating in second electrical coupling means of opposite gender to the first electrical coupling means, such that mating of respective ones of the first and second coupling means of opposite gender provides electrical communication from the first plurality of wires to the second plurality of wires; third opening means comprising an aperture in at least one of the front and rear surfaces of the panel providing communication between the interior of the panel and the exterior of the front or rear surface; and the second and third opening means cooperating to permit passage of a pair of the second electrical wires from the interior of the raceway through the interior of the panel to the exterior of the panel.

In another aspect, the invention involves a modular panel comprising: an interior bounded by front and rear surfaces joined by a plurality of edges and having incorporated therewith apparatus for dispersive routing of electrical wires of a communication signal distribution system through partition members, which apparatus comprises: an elongated raceway having an interior bounded by axial ends and top and bottom spaced apart substantially parallel structural members, the raceway cooperating with the panel; first opening means in the raceway providing for passage of a first plurality of wires from an exterior location into the interior of the raceway; an elongated casing having a length not greater than the length of the raceway and a height and depth not greater than the height and depth of the interior of the raceway, such that the casing is adapted to be removeably secured within the raceway; a plurality of first electrical coupling means within and attached to an interior surface of the casing, each coupling means comprising one gender of a male-female electrical coupler, and at least one of the coupling means being connected to a wire in the first plurality of wires; second opening means comprising an aperture in the raceway providing for passage of a second plurality of electrical wires between the interior of the raceway and the interior of the panel, each of the wires terminating in second electrical coupling means of opposite gender to the first electrical coupling means, such that mating of respective ones of the first and second coupling means of opposite gender provides electrical communication from the first plurality of wires to the second plurality of wires; third opening means comprising an aperture in at least one of the front and rear surfaces of the panel providing communication between the interior of the panel and the exterior of the front or rear surface; and the second and third opening means cooperating to permit passage of a pair of the second electrical wires from the interior of the raceway through the interior of the panel to the exterior of the panel.

In yet another aspect, the invention involves apparatus for dispersive routing of electrical wires of a communication signal distribution system from within a raceway which comprises: an elongated casing having a length not greater than the length of the raceway and a height and depth not greater than the height and depth of the interior of the raceway, such that the casing is adapted to be removeably secured within the raceway; and a plurality of first electrical coupling means within and attached to an interior surface of the casing, each coupling means comprising one gender of a male-female electrical coupler, and at least one of the coupling means being adapted to be connected to a wire in a plurality of wires.

In various preferred embodiments, the channel has a height and depth substantially equal to the height and depth of the interior of the raceway, such that the channel is adapted to be interfitted into and releaseably secured within the raceway by contact with opposed sides of the structural members. In other preferred embodiments, the channel is secured within the raceway by fastening means such as bolts, screws, releasable adhesives and the like.

In other various preferred embodiments, the raceway containing the channel may be disposed in a structure abutting the panel and attached to at least one of the panel's top, bottom or side, or the structure containing said raceway may be an extension member ("power pole") attached to the panel.

Other aspects and embodiments will be evident from the detailed description below.

DETAILED DESCRIPTION AND PREFERRED EMBODIMENTS

Figure 1:
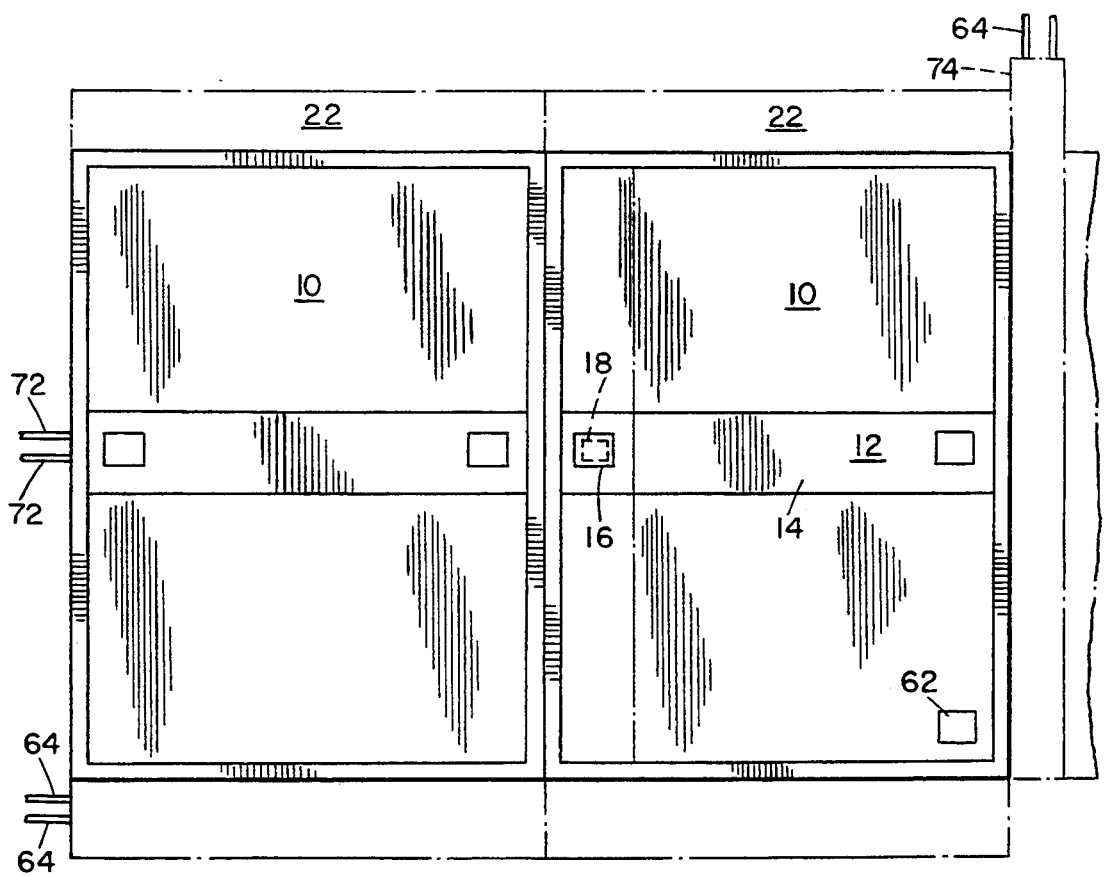
FIG. 1 in a front elevation view, showing two modular panels typical of the type used in office complexes and illustrating alternative locations for the communications cable raceway and apparatus of the invention.

The system of the present invention may be best understood by reference to the drawings. FIG. 1 shows two typical modular panels 10, joined by conventional mechanical couplings (not shown). It will be understood that these are typical of modular panels for office clusters and that in actual practice they would be interconnected with numerous others to form individual work areas or cubicles as desired. Not shown but well known to those skilled in the art are the numerous accessories and other structural features such as bookcases, desktops, storage cabinets, counters, and the like which can be readily attached to these panels to form the different types of work stations desired. None of these mechanical features is critical to the present invention. Rather, the user can determine the optimum configuration for the work tasks to be performed. Similarly, since the system of the present invention can be used with any type of modular panel, the description here is not to be intended to be limited to any particular panel type, structure, or commercial configuration.

In FIG. 1 are illustrated several different locations for a typical raceway 32 of the present invention including the internal electrical signal distribution system within that raceway. The raceway 32 may, for instance, be positioned horizontally at some location intermediate the top and bottom of the panel, as indicated at 12. For convenience, the raceway 32 is commonly located behind a removable or hinged decorative cover 14 which permits easy access to the apparatus, but also when closed provides a pleasing aesthetic appearance to the panel. Also typically present are removable covers 16 over openings 18 into which can be mounted conventional outlet boxes and outlets (not shown) for connection directly to the pieces of equipment.

Alternative locations for the raceway 32 include being mounted vertically within the panel as indicated at 20, mounted on top of the panel as indicated at 22, or mounted at the bottom of the panel as indicated at 24. Further, one can mount the raceway 32 at the side of a panel as indicated at 26 or intermediate two panels as indicated with structure 26 being disposed between panels 10 and 28.

A critical element of the structure of the present invention is a casing 30 which is mounted within the raceway 32. Raceway 32 is formed of structural members 34 which normally form a generally elongated conduit-like structure into which the casing 30 interfits, as will be described below. The particular configuration of the structural members 34 will be dependent upon the location of the raceway as indicated in FIG. 1. If the raceway 32 is in the panel interior, the structural members 34 will typically also function as part of the structure and framing of panel 10. If outside (but connected to) panel 10, the structural members 34 will form a generally channel-shaped conduit which will normally be further covered with decorative access strips such as those shown at 14 or 38. When the raceway 32 is outside but attached to a panel 10, the raceway shape will be maintained not only by structural members 34 but also by cross-members 36. The decorative covers can be attached by conventional means such as hinges or screws and will be positioned as indicated by a typical example 38 shown in FIG. 3, which is attached by screws 40. The other sides of raceway 32 will be similarly covered except for the side which abuts the panel 10. That side is normally left at least partially open or covered with a cover which has openings in it to provide communication routes for the electrical wires between the interior of the raceway 32 and the interior of the panel 10.

Figure 2:
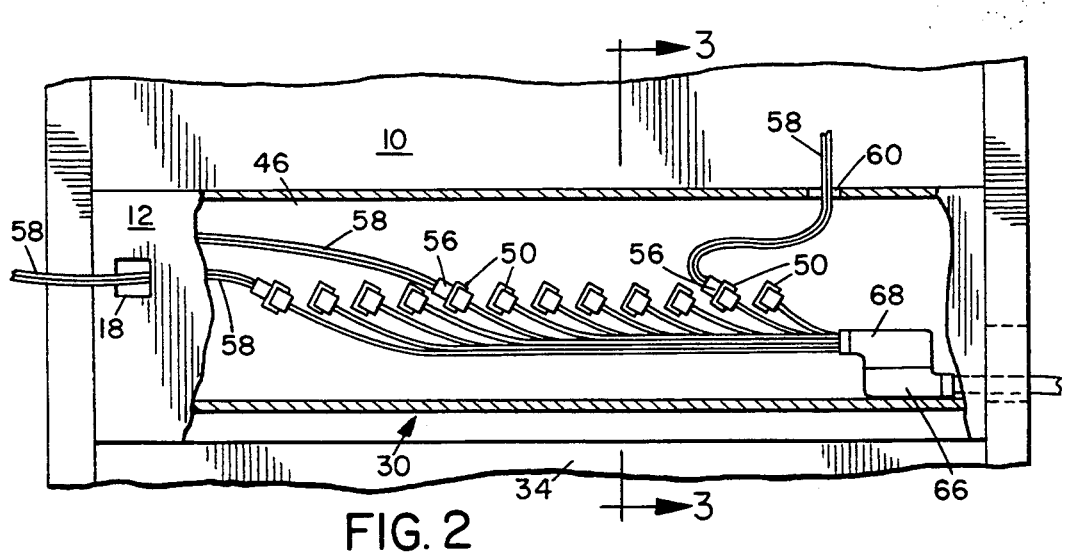
FIG. 2 is a front elevation view, partially in section, showing apparatus of the present invention incorporated into a raceway associated with a panel.
Figure 4:
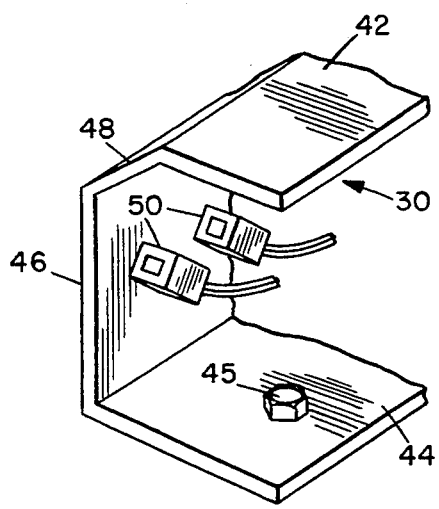
FIG. 4 is a perspective view of a segment of the apparatus of this invention, showing a typical alignment of connectors.
Figure 3:
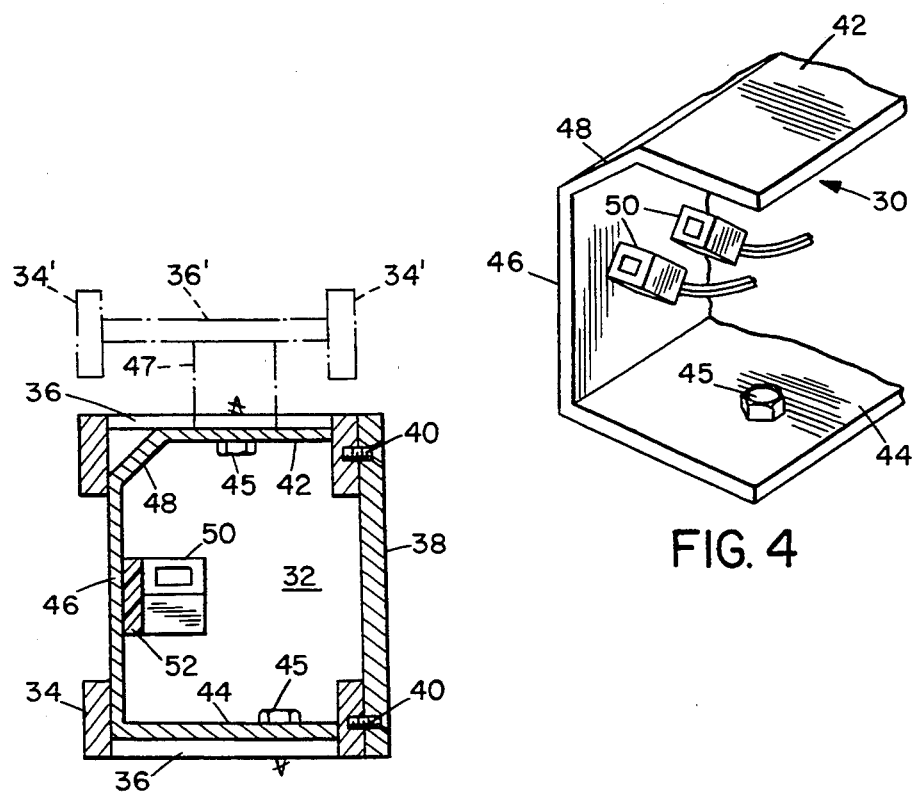
FIG. 3 is a cross-sectional view taken on line 3—3 of FIG. 2, and also illustrating alternative embodiments of the invention.

As shown in FIG. 3, the casing 30 essentially has a channel shape with a top 42, a bottom 44 and a back plate 46. Normally the top 42 and back plate 46 will be joined by a short angled section 48 to facilitate installation of the casing 30 into the raceway 32 or removal therefrom. In a preferred configuration the casing 30 will have a height essentially equal to the spacing of structural members 34 such that it will engage both structural members 34 and be held in place by the frictional engagement with them, as shown in solid lines in FIGS. 2 and 3. In such case the casing 30 can normally be removed by a simple hand pull. Alternatively, as shown partially in phantom in FIG. 3, the pairs of members 34 and 36 may be spaced farther apart than the height of casing 30 (as indicated by 34' and 36'). The casing 30 may then be secured in place by use of conventional fastening means 45, such as bolts or a sheet metal screws which secure bottom 44 of casing 30 to lower cross-member 36. Further as an alternative, there may be used a spacer 47 to span the gap between the top 42 of casing 30 and upper cross-member 36', which is secured by elongated bolt or sheet metal screw 45'.

Mounted on back plate 46 will be a plurality of male or female electrical couplers 50. These couplers 50 can be connected to the back plate 46 by any convenient means such as an adhesive layer 52, being fitted into a bracket 54 which has previously been adhered to the back plate 46, or by conventional screws (not shown). Other adhesion means will be readily apparent to those skilled in the art and are intended to be included within the scope of the present invention. These couplers 50 are commonly RJ45 telephone jacks or similar commercial electronic devices such as coaxial plugs. The couplers 50 will normally be arranged in a configuration such as that shown in FIGS. 5 or 6 for ease of connection and lack of interference between the different couplers. It is preferred to align the couplers 50 on the surface of the back 46 of the casing 30 at an angle such that the couplers 50 will be substantially parallel to each other, to minimize the interference between them when connecting or disconnecting mating couplers 56 for wires 58. Typically the couplers 50 will be mounted at an angle of between about 20°–45° to a longitudinal axis of the casing 30.

Figure 5:
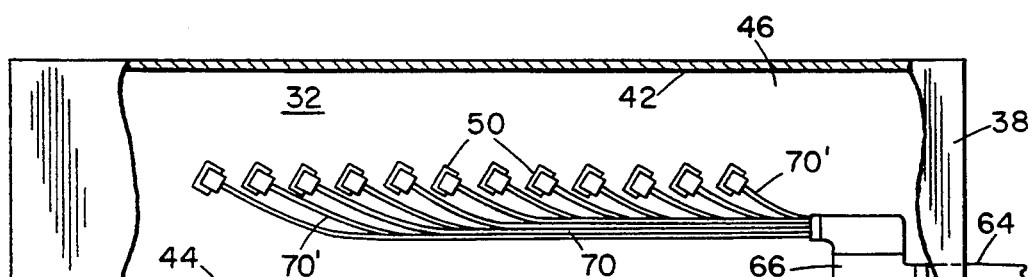
FIGS. 5 and 6 are front elevation views, partially cut away, showing two alternative configurations of couplers and connectors as used in the present invention, with FIG. 5 being a typical layout for telephone communication equipment and FIG. 6 being a typical layout for data transmission equipment.
Figure 6:
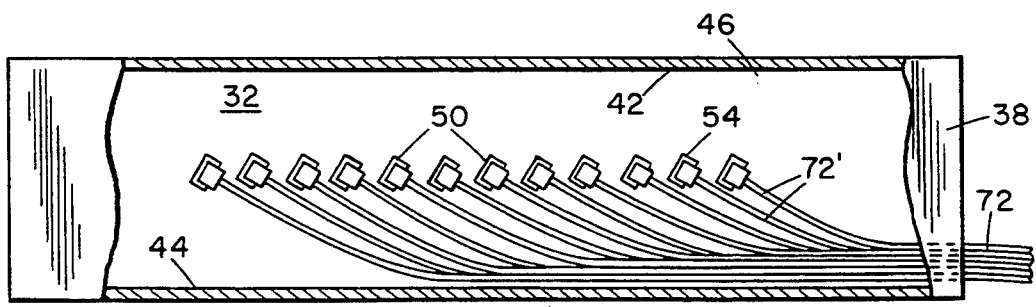

It will be evident in FIGS. 5 and 6 that the couplers 50 shown are only half of a coupling, and can be either the male or female half; it is preferred that the coupler 50 be a female half. The corresponding mating connection to the particular piece of equipment will, of course, represent the other gender half of the electrical coupling as shown in FIG. 2 where the coupling portion 50 is connected to a mating connector portion 56, which connector 56 is not attached to the back panel 46 but rather is free and connected to an individual piece of equipment (not shown) by a wire pair 58. A typical routing of these wire pairs 58 is shown in FIG. 3, with the wire pairs 58 either exiting through opening 18 to the exterior of the panel 10 or through opening 60 which leads into the interior of the panel 10 and thence through other openings 62 which may be positioned in any desired location on the panel 10 to provide for electrical communication with individual pieces of equipment.

Leading into the raceway 32 will either be a trunk cable 64 such as a typical 25-pair telephone cable or an equivalent multi-wire data communication cable which will be terminated in a connector 66. This connector 66 in turn will be mated with a connector 68 from which the individual wire pairs 70 are dispersed, with separate pairs 70' being routed to different connectors 50. A single pair 70' or two or more pairs 70' may be routed to a single connector. Alternatively, particularly where there is a problem with crosstalk and signal transmission speed, it may be preferred to have individual 4-wire-pair cables entering as at 72 and then being individually routed to the connectors 50 as indicated at 72'. The cable 64 or wire pairs 72 can enter from the side or midpoint as shown interchangeably by the indications 64 and 72 in FIG. 1. It is also possible to have an extension of the raceway, often called a "power pole" 74, through which the trunk cable 64 or wire pairs 72 are led into the raceway, also as shown in FIG. 1.

It will therefore be seen that the entire electrical distribution system of this invention, unlike systems of the prior art, fits comfortably within a typical raceway and can easily be removed by simply removing casing 30. Similarly, because of the alignment and fixed positioning of the couplers 50, it is easy to connect the short leads 58 to the individual pieces of equipment and to rearrange or disconnect and reconnect other leads 58 with a minimum of effort and no disruption of the structure.

It will be evident that there are numerous embodiments of the present invention, which will not expressly described above, are clearly within the scope and spirit of the invention. The above description is therefore intended to be exemplary only and the full scope of the invention is to be defined only by the appended claims.

I claim:

1. Apparatus for dispersive routing of wires of a communication signal distribution system through partition members which comprises:
    a panel having an interior bounded by front and rear surfaces joined by a plurality of edges;
    an elongated raceway having an interior bounded by axial ends and top and bottom spaced apart substantially parallel structural members, said raceway cooperating with said panel;
    first opening means in said raceway providing for passage of a first plurality of wires from an exterior location into said interior of said raceway;
    an elongated casing having a length not greater than the length of said raceway and a height and depth not greater than the height and depth of said interior of said raceway, such that said casing is adapted to be removeably secured within said raceway;
    a plurality of first coupling means within and attached to an interior surface of said casing, each said coupling means comprising one gender of a male-female coupler, each of said coupling means being adapted to be connected to a single wire in said first plurality of wires;
    second opening means comprising an aperture in said raceway providing for passage of a second plurality of wires between said interior of said raceway and said interior of said panel, said wires each terminating in individual second coupling means of opposite gender to said first coupling means, such that mating of respective ones of said first and second coupling means of opposite gender provides communication from a single one of said first plurality of wires to a single one of said second plurality of wires;
    third opening means comprising an aperture in at least one of said front and rear surfaces of said panel providing communication between said interior of said panel and the exterior of said front or rear surfaces; and
    said second and third opening means cooperating to permit passage of a pair of said second wires from the interior of said raceway through said interior of said panel to the exterior of said panel.

2. Apparatus as in claim 1 wherein said raceway is disposed within said panel, said raceway having a depth not greater than the depth of said panel and being disposed between said front and rear surfaces of said panel.

3. Apparatus as in claim 2 wherein said raceway extends across one major dimension of said panel.

4. Apparatus as in claim 3 wherein said raceway is incorporated into said panel with both of said top and bottom structural members of said raceway extending between two oppositely disposed edges.

5. Apparatus as in claim 1 wherein said raceway is disposed in a structure abutting said panel.

6. Apparatus as in claim 5 wherein said raceway is attached to at least one of a top, bottom or side of said panel.

7. Apparatus as in claim 5 wherein said raceway is disposed in an extension member attached to said panel.

8. Apparatus as in claim 2 further comprising an access aperture in at least one of said surfaces of said panel and providing direct access from said exterior of said panel into said interior of said raceway, said access aperture being of a size sufficient to enable said casing to be interfitted into and secured within said raceway from said exterior of said panel.

9. Apparatus as in claim 8 wherein said access aperture is closable.

10. Apparatus as in claim 2 wherein said first opening means comprises an aperture in one of said edges, said aperture being aligned with one of said ends of said raceway.

11. Apparatus as in claim 10 wherein there are a plurality of said apertures, with at least one said aperture aligned with each end of said raceway.

12. Apparatus as in claim 1 wherein said first opening means comprises an aperture in one of said ends of said raceway.

13. Apparatus as in claim 12 wherein there are a plurality of said apertures, with at least one said aperture disposed in each end of said raceway.

14. Apparatus as in claim 1 wherein there are a plurality of said second opening means in said front and rear surfaces.

15. Apparatus as in claim 1 wherein said casing has a height and depth substantially equal to the height and depth of said interior of said raceway, such that said casing is adapted to be interfitted into and releaseably secured within said raceway by contact with opposed sides of said structural members.

16. Apparatus as in claim 15 wherein a side of said casing is angled to facilitate said interfitting into said raceway.

17. Apparatus as in claim 15 wherein said casing can be released from its securement within said raceway by a firm hand pull.

18. Apparatus as in claim 1 wherein said casing is secured within said raceway by fastening means.

19. Apparatus as in claim 1 wherein said coupling means are aligned across said surface of said casing at an angle such that said coupler means are substantially parallel to each other.

20. Apparatus as in claim 19 wherein said angle is between about 20°–45° to a longitudinal axis of said casing.

21. A modular panel comprising:
an interior bounded by front and rear surfaces joined by a plurality of edges joined by a plurality of edges and having cooperating therewith apparatus for dispersive routing of wires of a communication signal distribution system through partition members, which apparatus comprises:;
an elongated raceway having an interior bounded by axial ends and top and bottom spaced apart substantially parallel structural members, said raceway cooperating with said panel;
first opening means in said raceway providing for passage of a first plurality of wires from an exterior location into said interior of said raceway;
an elongated casing having a length not greater than the length of said raceway and a height and depth not greater than the height and depth of said interior of said raceway, such that said casing is adapted to be removeably secured within said raceway;
a plurality of first coupling means within and attached to an interior surface of said casing, each said coupling means comprising one gender of a male-female coupler, each of said coupling means being adapted to be connected to a single wire in said first plurality of wires;
second opening means comprising an aperture in said raceway providing for passage of a second plurality of wires between said interior of said raceway and said interior of said panel, said wires each terminating in individual second coupling means of opposite gender to said first coupling means, such that mating of respective ones of said first and second coupling means of opposite gender provides communication from a single one of said first plurality of wires to a single one of said second plurality of wires;
third opening means comprising an aperture in at least one of said front and rear surfaces of said panel providing communication between said interior of said panel and the exterior of said front or rear surfaces; and
said second and third opening means cooperating to permit passage of a pair of said second wires from the interior of said raceway through said interior of said panel to the exterior of said panel.

22. A panel as in claim 21 wherein said raceway is disposed within said panel, said raceway having a depth not greater than the depth of said panel and being disposed between said front and rear surfaces of said panel.

23. A panel as in claim 21 wherein said raceway is disposed in a structure abutting said panel.

24. A panel as in claim 23 wherein said raceway is attached to at least one of a top, bottom or side of said panel.

25. A panel as in claim 21 wherein said raceway extends across one major dimension of said panel.

26. A panel as in claim 25 wherein said raceway is incorporated into said panel with both of said top and bottom structural members of said raceway extending between two oppositely disposed edges.

27. A panel as in claim 21 wherein said raceway is disposed in an extension member attached to said panel.

28. A panel as in claim 21 further comprising an access aperture in at least one of said surfaces of said panel and providing direct access from said exterior of said panel into said interior of said raceway, said access aperture being of a size sufficient to enable said casing to interfitted into and secured within said raceway from said exterior of said panel.

29. A panel as in claim 28 wherein said access aperture is closable.

30. A panel as in claim 21 wherein there are a plurality of said second opening means in said front and rear surfaces.

31. A panel as in claim 21 wherein said channel has a height and depth substantially equal to the height and depth of said interior of said raceway, such that said channel is adapted to be interfitted into and releaseably secured within said raceway by contact with opposed sides of said structural members.

32. A panel as in claim 31 wherein a side of said channel is angled to facilitate said interfitting into said raceway.

33. A panel as in claim 30 wherein said casing can be released from its securement within said raceway by a firm hand pull.

34. A panel as in claim 21 wherein said channel is secured within said raceway by fastening means.

35. Apparatus for dispersive routing of wires of a communication signal distribution system from within a raceway which comprises:
an elongated casing having a length not greater than the length of said raceway and a height and depth not greater than the height and depth of said interior of said raceway, such that said casing is adapted to be removeably secured within said raceway; and
a plurality of first coupling means within and attached to an interior surface of said casing, each said coupling means comprising one gender of a male-female coupler, each of said coupling means being adapted to be connected to a single wire in said first plurality of wires.

36. Apparatus as in claim 35 further comprising:
an elongated raceway having an interior bounded by axial ends and top and bottom spaced apart substantially parallel structural members, said raceway cooperating with said panel;
first opening means in said raceway providing for passage of a first plurality of electrical wires from an exterior location into said interior of said raceway for connection to respective ones of said coupling means; and
second opening means comprising an aperture in said raceway providing for passage of a second plurality of electrical wires from connection with said coupling means and between said interior of said raceway to the exterior of said raceway.

37. Apparatus as in claim 35 wherein said plurality of coupling means are aligned across said surface of said casing at an angle such that respective said coupling means are substantially parallel to each other.

38. Apparatus as in claim 37 wherein said angle is between about 20°–45° to a longitudinal axis of said casing.

39. Apparatus as in claim 35 wherein said casing has a height and depth substantially equal to the height and depth of said interior of said raceway, such that said casing is adapted to be interfitted into and releaseably secured within said raceway by contact with opposed sides of said structural members.

40. Apparatus as in claim 37 wherein a side of said casing is angled to facilitate said interfitting into said raceway.

41. Apparatus as in claim 40 wherein said casing can be released from its securement within said raceway by a firm hand pull.

42. Apparatus as in claim 35 wherein said casing is secured within said raceway by fastening means.

* * * * *

UNITED STATES PATENT AND TRADEMARK OFFICE
CERTIFICATE OF CORRECTION

PATENT NO. : 5,451,714
DATED : SEPTEMBER 19, 1995
INVENTOR(S) : DAVID B. DUFFIÉ

It is certified that error appears in the above-indentified patent and that said Letters Patent is hereby corrected as shown below:

COLUMN 10, CLAIM 31, LINE 15, CHANGE "CHANNEL" TO --CASING--; LINE 18, CHANGE "CHANNEL" TO --CASING--;

COLUMN 10, CLAIM 32, LINES 21/22, CHANGE "CHANNEL" TO --CASING--;

COLUMN 10, CLAIM 34, LINE 27, CHANGE "CHANNEL" TO --CASING--.

Signed and Sealed this

Twenty-third Day of January, 1996

Attest:

BRUCE LEHMAN

Attesting Officer    Commissioner of Patents and Trademarks